(12) United States Patent
Giuseppin et al.

(10) Patent No.: US 9,102,765 B2
(45) Date of Patent: Aug. 11, 2015

(54) SUBCRITICAL GAS ASSISTED DRYING OF BIOPOLYMER MATERIAL

(75) Inventors: Marco Luigi Federico Giuseppin, Gieten (NL); Peter Jan Smits, Eefde (NL); Gerard Willem Hofland, Hoogmade (NL)

(73) Assignee: COOPERATIE AVEBE U.A., Veendam GK (NL)

( * ) Notice: Subject to any disclaimer, the term of this patent is extended or adjusted under 35 U.S.C. 154(b) by 323 days.

(21) Appl. No.: 13/579,054

(22) PCT Filed: Feb. 18, 2011

(86) PCT No.: PCT/NL2011/050117
§ 371 (c)(1),
(2), (4) Date: Aug. 30, 2012

(87) PCT Pub. No.: WO2011/102723
PCT Pub. Date: Aug. 25, 2011

(65) Prior Publication Data
US 2012/0316331 A1     Dec. 13, 2012

(30) Foreign Application Priority Data
Feb. 19, 2010  (EP) .................................. 10154095

(51) Int. Cl.
| | | |
|---|---|---|
| *C07H 1/00* | (2006.01) |
| *C08B 30/06* | (2006.01) |
| *C08L 91/00* | (2006.01) |
| *C08L 3/02* | (2006.01) |
| *C08L 3/04* | (2006.01) |

(52) U.S. Cl.
CPC . *C08B 30/06* (2013.01); *C08L 3/02* (2013.01); *C08L 3/04* (2013.01); *C08L 91/00* (2013.01)

(58) Field of Classification Search
CPC ............. C08L 3/02; C08L 3/04; C08L 89/00; C08B 30/06
USPC ......................................................... 536/102
See application file for complete search history.

(56) References Cited

U.S. PATENT DOCUMENTS

| | | |
|---|---|---|
| 3,511,671 A | 5/1970 | Miles |
| 5,113,597 A | 5/1992 | Sylla |
| 2004/0210046 A1 | 10/2004 | Kersting et al. |
| 2008/0230050 A1 | 9/2008 | Kersting et al. |

FOREIGN PATENT DOCUMENTS

| | | |
|---|---|---|
| EP | 0252394 A1 | 1/1988 |
| WO | WO 2005122776 A1 | 12/2005 |
| WO | WO 2007068345 A1 | 6/2007 |
| WO | WO 20009/154440 A1 * | 12/2009 |

* cited by examiner

*Primary Examiner* — Elli Peselev
(74) *Attorney, Agent, or Firm* — Hoffmann & Baron, LLP

(57) ABSTRACT

A method is provided for producing a dehydrated biopolymer powder, said method comprising the successive steps of: a) providing a filter cake comprising biopolymer material and 30 to 60 wt. % of water; b) contacting said filter cake with a pressurized gas to extract water from the filter cake, said pressurized gas having a pressure and a temperature below the critical point of the gas; c) separating water-containing pressurized gas from the dehydrated filter cake; and d) collecting a dehydrated biopolymer powder wherein the pressurized gas has a pressure of at least 0.6 MPa (6 bar) and up to 6 MPa (60 bar), and a temperature of 10 to 40° C.

18 Claims, 2 Drawing Sheets

Brabender analysis

SUBCRITICAL GAS ASSISTED DRYING OF BIOPOLYMER MATERIAL

Figure 1:
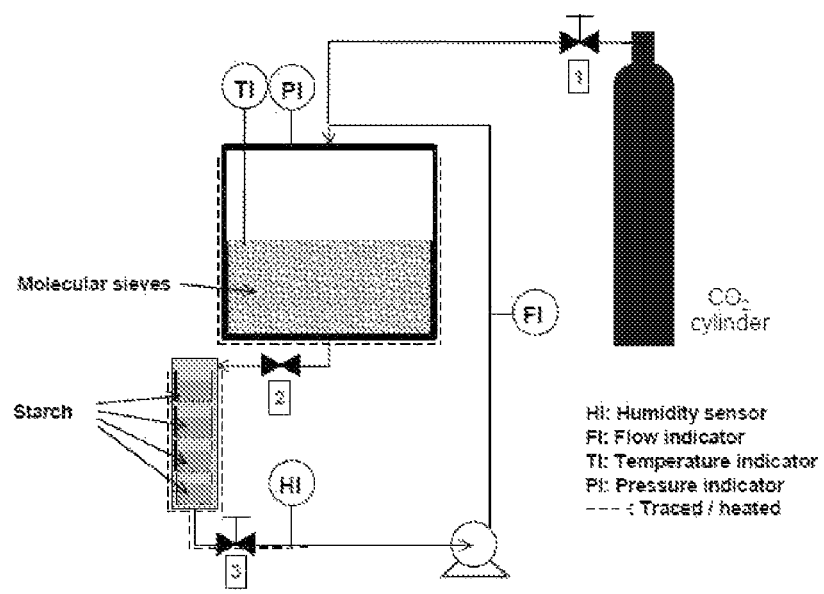

This application is the U.S. National Phase of, and Applicants claim priority from, International Patent Application Number PCT/NL2011/050117 filed 18 Feb. 2011 and European Patent Application Number 10154095.3 filed 19 Feb. 2010 which are incorporated herein by reference in their entirety.

TECHNICAL FIELD OF THE INVENTION

The present invention relates to a method of producing dehydrated biopolymer powder by using a pressurised gas in the subcritical state.

BACKGROUND OF THE INVENTION

Over the last one hundred years, global economic activities have increased at least fifty-fold. This extraordinary growth has raised serious concerns about current patterns of both consumption and production. As society has increased its understanding of the environmental implications of its industrial practices, more focus has been placed on the concept of sustainable economic systems that rely on renewable sources of energy and materials. The use of biologically derived polymers is an important component of this relatively new concept of economic development.

Through the transformation of agricultural or marine feedstocks, or the harnessing of enzymes found in nature, a new class of renewable, biodegradable, and biocompatible materials has emerged. Applications of biopolymers range from packaging to industrial chemicals, to computer storage media, and to medical implant devices. In addition to producing environmentally friendly materials with unique physical and chemical properties, the processes used to create biopolymers are receiving attention as possible sources of new manufacturing approaches that minimize energy consumption and waste generation.

In general, biopolymers fall into two principal categories, namely polymers that are produced by biological systems such as microorganisms, plants, and animals; and polymers that are synthesized chemically but are derived from biological starting materials such as sugars, amino acids, natural fats, or oils. Naturally occurring biopolymers include, for example, nucleic acids (DNA and RNA), proteins, polysaccharides (carbohydrates), polyhydroxyalkanoates, polyphenols, polyphosphates and polysulphates. There are several different classes of chemically synthesized biopolymers. Two particular groups include the family of polymers produced from lactic acid, and polymers derived from amino acids.

Whether a process involving biosynthesis, fermentation, methods of recombinant biotechnology, extraction from plants and higher organisms, or the chemical polymerization of naturally occurring monomers, processes for the isolation and production of biopolymer materials generally include procedures for drying the biopolymers. Frequently, the resultant biopolymeric material is provided in powder form and is to be processed by conventional plastic forming techniques such as extrusion and injection moulding.

The drying procedures often involve severe dehydration treatments such as drying with hot air, the use of chemical treatments and/or require lengthy drying periods. It is known, for example, that conventional methods for drying starch with hot air lead to damage of the starch granules. Particularly if the desirable characteristics of the biopolymeric material are adversely affected by heat induced or oxidative damage, lower temperatures need to be employed for the dehydration process but this results in long drying times. It is sometimes necessary to employ a plurality of drying techniques to reduce the drying period and/or to achieve desirably low moisture contents but this, in turn, gives rise to considerable cost increases due to factors such as the amount of energy used. The energy consumption of such procedures is accordingly a significant factor in the overall production cost of biopolymers.

There is a recognized need for a simple, effective method for drying biopolymer materials which is environmentally friendly and economical in terms of energy consumption and cost. The method of dehydration should also be one that does not adversely affect the desirable characteristics of the biopolymeric material.

Both US-A-2004/0210046 and US-A-2008/0230050 describe a method for the physical treatment of starch (derivatives) using densified gases in which the starch is essentially treated at a process temperature above the critical temperature of the gas used and, in particular, between 31 and 180° C., and at process pressures between 5 and 80 MPa (50 and 800 bar) for at least one minute, the density of the densified gas being greater than 180 kg/m$^3$. The starches thus treated are indicated to have reduced contents of water and lipids, and enhanced swelling and gelatinization behaviour.

SUMMARY OF THE INVENTION

The inventors have established that it is both simple and efficient to dehydrate biopolymer materials by using a pressurised gas in the subcritical state.

In accordance with the invention, a method is provided for producing a dehydrated biopolymer powder, said method comprising the successive steps of:
    a) providing a filter cake comprising biopolymer material and 30 to 60 wt. % of water;
    b) contacting said filter cake with a pressurised gas to extract water from the filter cake, said pressurised gas having a pressure and a temperature below the critical point of the gas;
    c) separating water-containing pressurised gas from the dehydrated filter cake; and
    d) collecting a dehydrated biopolymer powder
wherein the pressurised gas has a pressure of at least 0.6 MPa (6 bar) and up to 6 MPa (60 bar), and a temperature of 10 to 40° C.

Since the present process can be operated at relatively low temperatures, e.g. ambient temperature, any possible detrimental effects of heat exposure can be avoided, thereby rendering the process particularly suitable for the treatment of thermo-sensitive biopolymeric materials. Despite the relatively low operating temperatures, the present method advantageously provides for high yields of dehydrated biopolymer powder at short residence times of the pressurized gas. The relatively low operating pressure of the gas also assists to keep operating costs low and avoids the need to invest in expensive high pressure equipment.

DRAWINGS

FIG. 1 provides a schematic representation of equipment for the drying of starch using liquid carbon dioxide in accordance with an embodiment of the present invention.

Figure 2A:
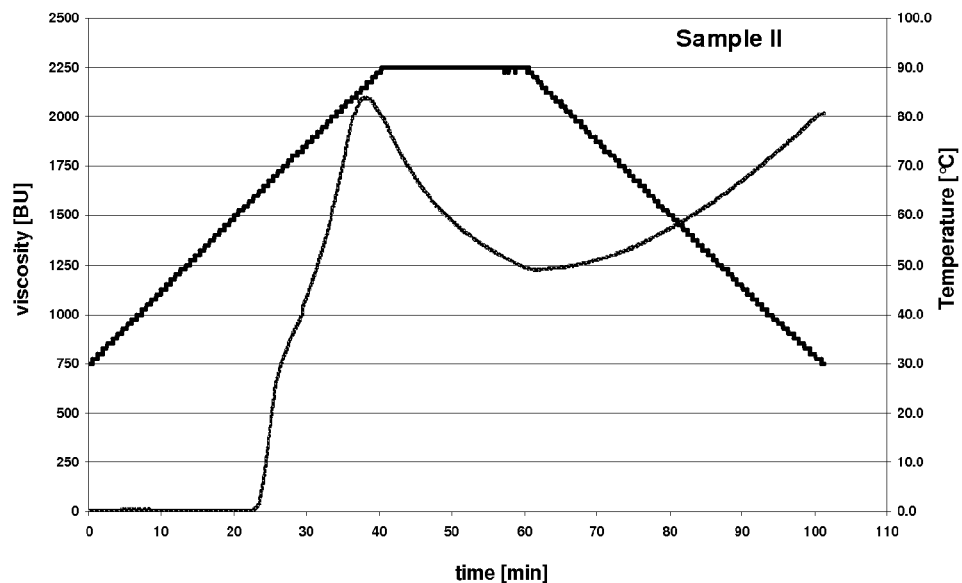
Figure 2B:
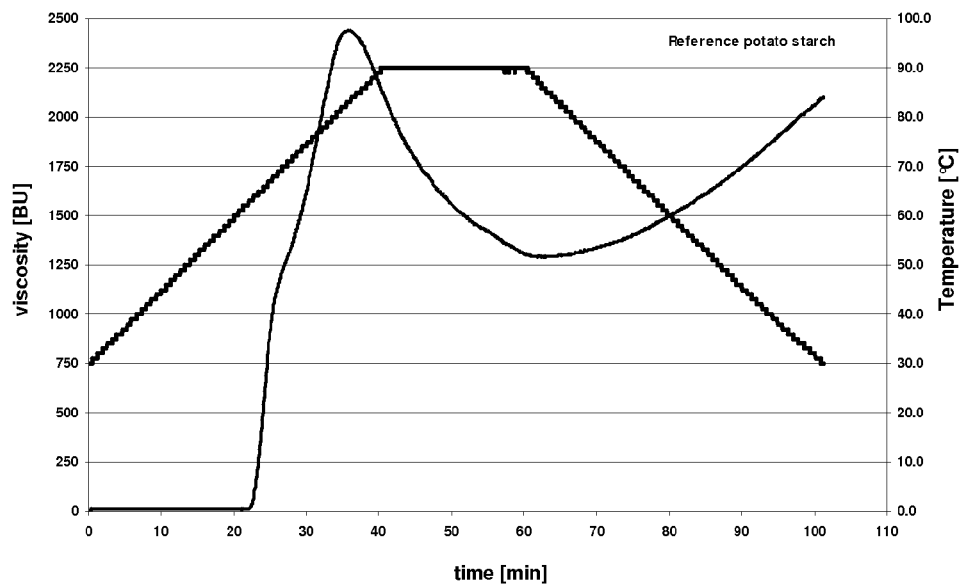

FIGS. 2A and 2B show the respective results of a comparative Brabender viscosity analysis for potato starch dried with subcritical carbon dioxide and for native potato starch dried using a conventional tunnel-heater drier.

DETAILED DESCRIPTION OF THE INVENTION

As indicated herein above, regardless of whether the isolation and/or production of biopolymer materials involves a process of biosynthesis, fermentation, methods of recombinant biotechnology, extraction from plants and higher organisms, or the chemical polymerization of naturally occurring monomers, the final stage of isolation and/or preparation generally includes procedures for drying the biopolymers. Prior to the step of drying the biopolymeric materials, the isolated and/or prepared biopolymer is commonly obtained as a filter cake, whereby a liquid, e.g. aqueous, slurry of the biopolymer is pressed against a liquid-permeable filter.

In accordance with the method of the present invention, the resultant filter cake comprising biopolymer material can then be contacted with a pressurised gas to extract water from the filter cake, the pressurised gas having a pressure and a temperature below the critical point of the gas. Thereafter, water-containing pressurised gas is separated from the dehydrated filter cake which then allows for the collection of a dehydrated biopolymer powder. Thus, in effect, the pressurised gas is passed through a bed comprising the biopolymer material, preferably through a bed of the biopolymer material, itself.

Typical examples of biopolymer materials that may be advantageously dehydrated by the present method include nucleic acids, proteins, polysaccharides, polyhydroxyalkanoates, polyphenols, polyphosphates and polysulphates, lactic acid polymers, and polyamino acids. Where appropriate, the biopolymer materials can be microbially derived and/or produced by recombinant DNA techniques.

After proteins, polysaccharides are among the most diverse and complex group of biopolymers. A number of polysaccharides, e.g. xanthan, dextran, cellulose and pullulan, can be produced by certain bacterial or fungal species by fermentation, while several polysaccharides, e.g. starch, cellulose, agar, carageenan and chitin, are readily derived from plants or higher organisms, which plants or higher organisms can also be genetically modified.

In a particularly preferred embodiment of the present invention, the biopolymer material is selected from the group of native plant starch, preferably starch from potatoes, maize, wheat, rice, barley and tapioca; starch from genetically modified plants; physically and/or chemically modified starch, e.g. starch which has been altered by gelatinization, acidification, oxidation, esterification, etherification, crosslinking or ionic modification; enzymatically modified starch; or any combinations or mixtures thereof.

The term "gas" as used herein refers to a substance or element, or to a mixture of substances and/or elements that is/are gaseous at a pressure of 0.1 MPa (1 atmosphere; 1 bar) and a temperature of 20° C. and that can be brought into a liquid or supercritical state by increasing pressure to at least 1 MPa (10 bar), preferably to at least 2 MPa (20 bar).

In a particularly preferred embodiment, the temperature of the pressurised gas during the contacting step does not exceed 30° C., more preferably it does not exceed 25° C., and most preferably it does not exceed 20° C. Execution of the contacting step is particularly preferred at a temperature of 5 to 25° C., even more preferably at a temperature of 5 to 20° C.

According to a particularly preferred embodiment, the pressurised gas employed in the present method is a liquefied gas.

The pressurised gas employed in the present method may be advantageously selected from the group consisting of carbon dioxide, nitrous oxide, ethane, ethylene propane, cyclopropane, propylene, butane and mixtures thereof. In view of its inert properties, toxilogical safety, good availability, and its physical and physicochemical properties, carbon dioxide is preferred. In a particularly preferred embodiment, the pressurised gas is carbon dioxide having a pressure of at least 0.6 MPa (6 bar) and up to 6 MPa (60 bar), even more preferably, a pressure of at least 0.6 MPa (6 bar) but less than 4 MPa (40 bar), and a temperature of 15 to 25° C. The critical point for carbon dioxide is 7.29 MPa (72.9 bar) at 31.1° C.

In order to achieve the extraction of substantial quantities of water from the filter cake comprising biopolymer material it is important to contact the filter cake with a pressurised gas that has a low moisture content, e.g. a water content below 0.3 wt. %, more particularly a water content below 0.1 wt. %.

The solubility of water in pressurised gas is typically rather low. Accordingly, in order to avoid the use of large quantities of pressurised gas, it is preferable to recirculate the pressurised gas across means that are capable of removing the extracted water.

Thus, in a particularly preferred embodiment, following the separation of the pressurised gas from the dehydrated filter cake of biopolymer, the pressurised gas is dried by removal of water contained therein and the thus obtained dried pressurised gas is recirculated to the filter cake. By selectively removing water from the pressurised gas, the extraction of components other than water may be minimised very effectively. Particularly if a relatively low volume of pressurised gas is used, the gas will become saturated with extractables other than water quite quickly and, thereafter, further extraction of such extractables will be minimal.

The water may be removed from the (recirculated) pressurised gas by any suitable means known in the art. The extracted water may be recovered from the pressurised gas by, for example, reducing the pressure and/or temperature of the gas so as to substantially decrease the solubility of water therein. Alternatively, in a preferred embodiment of the present invention, the water may be removed from the pressurised gas by contacting the gas with a water adsorbent and/or a water absorbent that is immiscible with said pressurised gas. The water adsorbent and/or absorbent may be a liquid or solid, preferably particulate, material. Examples of suitable adsorbents and absorbents include activated silicates, including activated clays and aluminosilicates; inorganic salts (e.g. calcium chloride, sodium bicarbonate, sodium carbonate and calcium sulphate); superabsorbent polymers (especially polyacrylates; acrylate copolymers, chitosan salts and surfactant-treated polyolefins, e.g. surfactant-treated polypropylene); cellulose, starch and modified starches. Notably, cellulose and starch may be suitably employed in the form of natural organic materials, e.g. paper, corncob, cotton, cork, peat or straw.

According to a particularly preferred embodiment of the invention, the water is removed from the pressurised gas by contacting the gas with activated silicates, especially microporous silicates (aluminosilicates such as Zeolite 3A and 4A being particularly preferred) since these silicates are capable of selectively removing water whilst not extracting larger molecules, e.g. flavour molecules, from the pressurised gas. Thus, as explained previously, by continuously removing water from the recirculating pressurised gas, extraction of (desirable) components from the biopolymer filter cake other than water is minimized effectively.

The applied amount of water adsorbent and/or water absorbent material may be suitably used to control the amount of water that is removed from the biopolymer filter cake. When the water removing capacity of the water adsorbent or water absorbent material has been exhausted, no further water will be extracted. Consequently, it is possible to calculate how much water adsorbent and/or absorbent is needed to remove a predetermined amount of water.

According to a further particularly preferred embodiment of the invention, the water is removed from the pressurised gas by using gas-water selective membranes which provide for a low energy alternative. This may include micro-/nano-porous membranes with microchannels for the gas/water separation or a combination of a water selective membrane, e.g. sulfonated polyether etherketone (SPEEK), and a gas selective membrane, e.g. a carbon dioxide gas selective membrane such as polydimethylene siloxane (pdms).

The efficacy of the present dehydration process may be suitably controlled by continuously monitoring the moisture content of the recirculating pressurised gas. If, for example, the moisture of the gas that has been contacted with the biopolymer filter cake falls below a certain preset value, this can be used as an indicator that the process may be discontinued. Furthermore, if the moisture content of the gas which has been passed through/over a water adsorbent and/or water absorbent exceeds another preset value, this may indicate that the circulation flow should be reduced and/or that the water adsorbent and/or water absorbent material needs to be regenerated or replaced.

It may be advantageous to vary the rate of drying at different stages of the present process so as to optimize the quality of the dehydrated biopolymer powder. The drying rate may be controlled by removing or adding water adsorbent/absorbent material (whilst maintaining pressure) and/or by changing the gas circulation flow rate and/or by diverting a part of the gas flow so it will pass the water adsorbent/absorbent material. According to a preferred embodiment, the present process employs a high initial flow rate of pressurised gas which is gradually reduced as the extraction of water from the biopolymer filter cake progresses.

In this regard, for example, the amount of carbon dioxide that is typically required to reduce the water content of the biopolymer material from 40 wt. % to 20 wt. % is 170 times higher than the amount of intake biopolymer material. The drying with $CO_2$ is generally not compromised by a higher gas flow rate and is not greatly influenced by increasing the gas pressure. The drying process proceeds exponentially as a function of the moisture content of the biopolymeric material.

Typically, the flow rate employed in the present process represents a contact time of more than 5 minutes. Shorter contact times can be employed. This is limited by the pressure drop over the biopolymer filter cake and the specific diffusion rate of water in the specific biopolymer.

Under conditions in accordance with the process of the present invention, $CO_2$, for example, dissolves 0.21 wt. % water in practice. Data in the literature refer to a solubility of 0.18 wt. % water in $CO_2$ at 10 MPa (100 bar) and 40° C.

The mass of liquid $CO_2$ determines the drying within a broad range of flow rates. The minimal $CO_2$ flow rate is essentially determined by the economic constraints and desired productivity. The final moisture content of biopolymer material, $x_m$ in wt. %, can be calculated by equation (1):

$$x_m = x_o \exp\left(-\frac{m}{m_c}\right) \quad (1)$$

wherein $x_o$ is the initial water content in wt. %, m is the mass of dry $CO_2$ employed, and $m_c$ is the mass of $CO_2$ required to remove a factor 1/e of water.

The dehydrated biopolymer powder obtained by the present method typically contains 21 wt. % or less of water, preferably less than 10 wt. % of water. For commercial grade potato starches, for example, 19-21 wt. % water is desirable but, for particular applications, the water content may need to be even lower. In the example set forth herein below, up to 200 kg liquid $CO_2$ per kilogram of starch filter cake is needed to reach such commercially acceptable water levels.

In the present method, the biopolymer filter cake is typically contacted with the pressurised gas for at least 5 minutes, preferably for at least 10 minutes, most preferably for at least 60 minutes so as to achieve a substantial reduction in moisture content. The mass of pressurised gas employed and the gas flow pattern determine the contact time.

Co-solvents such as ethanol, butanol and isobutanol can be employed together with the pressurised gas to assist in removing water from the filter cake. Nevertheless, such co-solvent assisted drying needs to be scrutinized carefully in relation to any particular biopolymer material since it may negatively affect certain desirable properties of the biopolymer.

The invention is further illustrated by means of the following example.

EXAMPLE

Example

Drying of Starch Filter Cake

Experimental Procedure

Filter cake drying experiments were conducted in a batch reactor which permits the drying of batches of 0.75 to 1.0 kg of filter cake in liquid $CO_2$ flow at pressures up to 6 MPa (60 bar). A schematic representation of the processing equipment is depicted in FIG. 1. The process was carried out in two steps.

In the first step, $CO_2$ flows through the previously weighed filter cake against atmospheric pressure. This theoretically means that the pressure drop over the filter cake can be large [up to 6 MPa (60 bar)] but the pressure drop was limited to a maximum of 0.8 MPa (8 bar).

In the second step, the filter cake is dried using liquid carbon dioxide. At a maximum of 0.8 MPa (8 bar), a $CO_2$ flow of not more than 120 kg/h (see values in results below) was passed through the batch reactor at temperatures of 15 to 25° C. The carbon dioxide flow was dried using molecular sieves, namely Zeolite type 3A. The maximum solubility of water in carbon dioxide under these condition is about 1.2 g/kg $CO_2$. The mass of $CO_2$ required to remove a factor of 1/e of water from the starch (see types of starch herein below) was determined to be $m_c=0.26$. After 5-8 hours, depending on the amount of $CO_2$ used, the resultant filter cake (powder) was collected, weighed and its moisture content (humidity) determined using a Sartorius MA 30 and drying at 120° C.

Types of Starch Used

Normal potato starch containing predominantly amylopectin and 20 to 25 wt. % amylose is used as a reference for the determination of drying properties.

Fresh filter cake starch from waxy potato starch containing amylopectin (Eliane) starch. This starch has a 10 to 15% slower drying rate than normal potato starch when a conventional pneumatic dryer or spray-dryer is employed.

Experimental Details/Results

Experiment I

Amount of zeolite (3A): 4 kg
Amount of wet starch filter cake (normal): 896.5 g
Amount of water pressed out in step 1: 245 ml Weight loss after step 1: 27.3%
Total $CO_2$-flow confronted with filter cake in step 2: 530 kg
Final flow-rate: 38 kg/h
Amount of filter cake after step 2: 584.9 g
Humidity: 12.79 wt. %
Total weight loss step 1+step 2: 311.6 g (34.8%)

Experiment II

Amount of zeolite (3A): 4 kg
Amount of wet starch filter cake (normal): 1105 g
Amount of water pressed out in step 1: 260 ml
Weight loss after step 1: 23.5%
Total $CO_2$-flow confronted with filter cake in step 2: 210 kg
Final flow-rate: 103.4 kg/h
Amount of filter cake after step 2: 643.9 g
Humidity: 20.55 wt. %
Total weight loss step 1+step 2: 461.1 g (41.7%)

The wet filter cake in Experiment II was wetter compared to Experiment I, further more the weight loss during step 2 was in agreement with a water in carbon dioxide solubility of ca. 0.9 g/kg, which was to be expected (0.9-1.3 g/kg). This may lead to the conclusion that some channeling occurred in Experiment I.

Experiment III

Amount of zeolite (3A): 4 kg
Amount of wet starch filter cake (normal): 1200 g
Amount of water pressed out in step 1: 254 ml
Weight loss after step 1: 21.2%
Total $CO_2$-flow confronted with filter cake in step 2: 145 kg
Final flow-rate: 80 kg/h
Amount of filter cake after step 2: 751.1 g
Humidity: 20.67 wt. %
Total weight loss step 1+step 2: 448.9 g (37.4%)

The outcome results in a water-carbon dioxide solubility of 1.3 g/kg.

Experiment IV

Amount of zeolite (3A): 4 kg
Amount of wet starch filter cake (Eliane): 754 g
Amount of water pressed out in step 1: 0 ml
Weight loss after step 1: 0.0%
Total $CO_2$-flow confronted with filter cake in step 2: 80 kg
Final flow-rate: 25 kg/h
Amount of filter cake after step 2: 648.2 g
Humidity: 26.71 wt. %
Total weight loss step 1+step 2: 105.8 g (14.0%)

The initial cake was significantly less moist compared to the other experiments. The risk of channeling is much higher. Step 1 was not possible because the gas immediately passed through the filter. However, the water-carbon dioxide solubility was 1.3 g/kg, as was the case in Experiment III.

Experiment V

Amount of zeolite (3A): 4 kg
Amount of wet starch filter cake (normal): 1214 g
Amount of water pressed out in step 1: 210 ml
Weight loss after step 1: 17.3%
Total $CO_2$-flow confronted with filter cake in step 2: 346 kg
Final flow rate: 80 kg/h
Amount of filter cake after step 2: 762 g
Humidity: 24.05 wt. %
Total weight loss step 1+step 2: 452 g (37.3%)

After step 1, the humidity of the filter cake was measured (35.86 wt. %). The water-carbon dioxide solubility was 0.7 g/kg, about half the possible 1.3 g/kg.

Experiment VI

Amount of zeolite (3A): 4 kg
Amount of wet starch filter cake (normal): 1235 g
Amount of water pressed out in step 1: 200 ml
Weight loss after step 1: 16.2%
Total $CO_2$-flow confronted with filter cake in step 2: 250 kg
Final flow-rate: 65 kg/h
Amount of filter cake after step 2: 831 g
Humidity: 24.72 wt. %
Total weight loss step 1+step 2: 404 g (32.7%)
Water-carbon dioxide solubility=0.8 g/kg.

Discussion

Generally, in wet potato starch one distinguishes between four different ways in which the water is present in the matrix:
Type I: Free water surrounding the starch particles (approximately 60% of total water in matrix).
Type II: Water attached to starch particles at contact points. This water is subject to capillary forces and, as such, there is more interaction between the matrix and the water.
Type III: Water in pores of the particles.
Type IV: Interstitial water.

Type II and Type III water account for approximately 20% of the total amount of water in the wet starch matrix. In order to obtain commercial grade potato starch, the product must be dried up to Type III water so that a product with a moisture content of approximately 20 wt. % is obtained.

Drying of starch filter cake is conventionally conducted in a two-step process whereby, in the first step, the moisture content of the filter cake is reduced from 50 wt. % to 40 wt. % by means of a vacuum drum filter technique. In a subsequent step, the moisture content is reduced further to less then 20 wt. % in a tunnel-heater (air drying). The energy consumption of this drying process is significant.

From the results of the above-described experiments, it is evident that the drying method underlying the present invention adequately permits the removal of Type I, II and III water in a single procedure such that the aforementioned conventional two-stage drying process (vacuum drum and air drying) could be replaced thereby. As previously mentioned herein above, the present invention accordingly provides for a simple process which is also efficient in terms of both cost and energy consumption.

It is also evident from the results provided in the table below that high pressure drops over the filter cake of 6 MPa (60 bar) are not essential to achieve dried filter cake which meets moisture content requirements for commercial use. The use of such low pressure liquid carbon dioxide is advantageous in terms of processing, investment and operational costs.

Various properties of the subcritical $CO_2$ dried potato starch were investigated and compared to those of native potato starch dried using a tunnel-heater drier. The properties investigated included, amongst others, pH, viscosity profile, and peak viscosity determined using Brabender (E-type). FIGS. 2A and 2B show the Brabender viscosity analysis for subcritical $CO_2$ dried potato starch (experiment II above) and for native potato starch dried using a tunnel-heater drier, respectively. The viscographs were recorded using a Brabender (E-type at 250 cmg) with a 3% suspension of the starch in demineralized water. The temperature profile followed was increasing from 30° C. to 90° C. at 1.5° C./min., holding at 90° C. for 20 minutes and then cooling down to 30° C. at 1.5° C./min.

No significant changes in the various starch properties were observed which reflects the mild and effective mode of drying of the starch filter cakes.

TABLE 1

| Sample experiment | Potato starch | Comments | Pressure drop over bed MPa (bar) | Moisture before test (wt. %) | Moisture after test (wt. %) |
|---|---|---|---|---|---|
| I | wet filter cake (normal) | starch dry, rewetted | 0.8 (8) | 49.50 | 12.79 |
| II | wet filter cake (normal) | starch dry, rewetted | 0.8 (8) | 49.50 | 20.55 |
| III | wet filter cake (normal) | starch dry, rewetted | 0.8 (8) | 49.50 | 20.67 |
| IV | wet filter cake (Eliane) | starch fresh filter cake, amylopectin | 0.8 (8) | 57.50 | 26.71 |
| V | wet filter cake (normal) | starch fresh filter cake | 0.8 (8) | 35.86 | 24.05 |
| VI | wet filter cake (normal) | starch fresh filter cake | 0.8 (8) | 35.86 | 24.72 |
| Reference | Reference potato starch | | | | 15.2** |

**dried using a tunnel-heated drier

The invention claimed is:

1. A method of producing a dehydrated biopolymer powder, said method comprising the successive steps of:
   a) providing a filter cake in the form of an isolated and/or prepared biopolymer comprising biopolymer material and 30 to 60 wt. % of water;
   b) contacting said filter cake with a pressurised gas to extract water from the filter cake, said pressurised gas having a pressure and a temperature below the critical point of the gas;
   c) separating water-containing pressurised gas from the dehydrated filter cake; and
   d) collecting a dehydrated biopolymer powder,
wherein the pressurised gas has a pressure of at least 0.6 MPa (6 bar) and up to 6 MPa (60 bar), and a temperature of 10 to 40° C.,
wherein the biopolymer material is selected from the group of native plant starch, starch from a genetically modified plant, physically modified starch, chemically modified starch, enzymatically modified starch, protein, and combinations thereof.

2. Method according to claim 1, wherein said contacting step b) is executed at a temperature of 5 to 25° C.

3. Method according to claim 1, wherein the biopolymer material is native plant starch.

4. Method according to claim 1, wherein the pressurised gas is a liquefied gas.

5. Method according to claim 1, wherein the pressurised gas is selected from carbon dioxide, nitrous oxide, ethane, ethylene propane, cyclopropane, propylene, butane and mixtures thereof.

6. Method according to claim 5, wherein the pressurised gas is carbon dioxide having a pressure of less than 4 MPa (40 bar), and a temperature of 15 to 25° C.

7. Method according to claim 1, wherein the filter cake is produced by pressing an aqueous slurry containing the biopolymer material against a water-permeable filter.

8. Method according to claim 7, wherein a compressed gas is used to apply the pressure onto the aqueous slurry.

9. Method according to claim 8, wherein the compressed gas and the pressurised gas are identical.

10. Method according to claim 1, wherein the filter cake is contacted with the pressurised gas for at least 5 minutes.

11. Method according to claim 1, wherein, following the separation of the water-containing pressurised gas, said water-containing pressurised gas is dried by removal of water contained therein and the thus obtained dried pressurised gas is recirculated to the filter cake.

12. Method according to claim 11, wherein the water is removed from the pressurised gas by contacting the gas with a water adsorbent and/or a water absorbent that is immiscible with said pressurised gas, or with a membrane having a selectivity for the gas and water.

13. Method according to claim 1, wherein the water content of pressurised gas that is brought into contact with the filter cake is below 0.1 wt. %.

14. Method according to claim 1, wherein the water content of the dehydrated biopolymer powder is 21 wt. % or less.

15. Method according to claim 1, wherein collecting the dehydrated biopolymer powder is made possible by the instant pressure release.

16. Method according to claim 1, wherein the filter cake is contacted with the pressurised gas for at least 10 minutes.

17. Method according to claim 1, wherein the filter cake is contacted with the pressurised gas for at least 60 minutes.

18. Method according to claim 1, wherein the water content of the dehydrated biopolymer powder is less than 10 wt. %.

* * * * *